J. F. FITCH & F. C. STEPHENS.
APPARATUS FOR STRAINING LIQUIDS.
APPLICATION FILED APR. 4, 1914.

1,235,672.

Patented Aug. 7, 1917.
7 SHEETS—SHEET 3.

J. F. FITCH & F. C. STEPHENS.
APPARATUS FOR STRAINING LIQUIDS.
APPLICATION FILED APR. 4, 1914.

1,235,672.

Patented Aug. 7, 1917.

Witnesses.
A. D. Dimond
F. E. Prochnow

Inventors.
John F. Fitch
and Floyd C. Stephens
by Wilhelm Parker
Attorneys

UNITED STATES PATENT OFFICE.

JOHN F. FITCH AND FLOYD C. STEPHENS, OF BUFFALO, NEW YORK, ASSIGNORS TO RUDOLPH A. WITTEMANN, OF BUFFALO, NEW YORK.

APPARATUS FOR STRAINING LIQUIDS.

1,235,672.　　　Specification of Letters Patent.　　Patented Aug. 7, 1917.

Application filed April 4, 1914. Serial No. 829,486.

*To all whom it may concern:*

Be it known that we, JOHN F. FITCH and FLOYD C. STEPHENS, citizens of the United States, residing at Buffalo, in the county of Erie and State of New York, have invented a new and useful Improvement in Apparatus for Straining Liquids, of which the following is a specification.

This invention relates to improvements in apparatus for straining liquids or removing solid or semi-solid particles therefrom, and more particularly to straining the hops from the wort in the process of brewing beer.

During the process of brewing beer, the hops are allowed to remain in the hot wort for a limited period of time, during which time certain of the more readily soluble resins are dissolved in the wort to give the beer an agreeable bitter taste. If the hops remain in the wort too long, some of the less soluble resins are also dissolved and render the beer objectionably bitter. It is therefore desirable to provide means for quickly removing the hops from the wort after they have been in the liquid for the desired length of time. In strainers as heretofore made, the hop leaves are not removed from the strainer until the entire charge of wort has passed through the strainer, so that some of the hop leaves which are first to enter the strainer are washed by all the wort which passes through the strainer, thus washing or dissolving out of these leaves much of the objectionable resins. These strainers also greatly retard the flow of wort after the openings in the strainers become more or less clogged up by the hop leaves.

The objects of the invention are to provide an apparatus adapted to remove the solid matter from the strainer during the straining of the liquid or wort, to rinse or sparge the solid matter to remove the wort therefrom; also to provide means for compressing the solid matter when it is removed from the liquid to partially dry the same; also to improve the construction of apparatus of this kind in the respects hereinafter specified.

In the accompanying drawings, consisting of seven sheets:

Fig. 10$^a$ is a fragmentary plan view of the strainer of the apparatus, on an enlarged scale.

The apparatus embodying this invention is primarily intended for removing the hops from the wort in the process of brewing beer, and the liquid will hereinafter be referred to as "wort," and the solid or semisolid material to be separated therefrom will be referred to as "hops," but it is not intended thereby to limit the invention to the separating of hops from wort.

In the apparatus embodying the invention the wort is passed through a suitable strainer on which the hops are deposited and from which they are removed and taken out of the wort by continuously operating means, so that the perforations in the strainer are kept clear to permit the rapid flow of wort through the same, and the hops are quickly removed from the wort to prevent the dissolving in the wort of the objectionable resins contained in the hops. The hops, after having been removed from the wort, are thoroughly washed or sparged to remove the wort therefrom and are then compressed to further remove the wort or liquid therefrom. The liquid pressed from the hops may be added to the wort or run into a waste pipe, as desired, and the hops after being compressed are sufficiently dry to permit them to be burned or otherwise disposed of.

The straining apparatus is arranged within a suitable reservoir or tank A, which, in the construction shown, is substantially rectangular in shape and is provided with a suitable cover A' which is hinged or otherwise removably secured on the tank so that it entirely incloses the same to prevent the escape of steam but it can be easily removed to render the inside of the tank readily accessible for cleaning. The liquid or wort is conducted to the tank through an inlet pipe $a$ and is discharged from the tank through an outlet pipe $a'$, preferably provided with a hand operated valve $a^2$, Fig. 2.

B represents a strainer which is arranged in the tank between the inlet and outlet pipes and thus divides the tank into two parts, one of which contains liquid to be strained and the other of which contains the liquid which has passed through the strainer. The strainer preferably consists of a plate which may, if desired, consist of several sections and which is provided with slots $b$ extending lengthwise of the plate through which the liquid is adapted to flow. In the construction shown the strainer is arranged at an inclination so that the upper end thereof projects above the level of the liquid in the tank and is supported by longitudinal and transverse bars $b'$ $b^2$ which are suitably secured in the tank. This arrangement of the strainer in the tank makes it possible to secure a large straining surface below the level of the liquid in the tank and also permits some of the liquid to drain from the hops after they are removed out of the liquid onto the upper part of the strainer plate. Means are provided for continuously removing from the upper face of the strainer the hops which are deposited thereon as the wort flows through the perforations of the strainer, and for removing the hops from the wort. The means employed for this purpose are preferably constructed as follows:

A pair of endless sprocket chains C C passing around sprocket wheels $c$ $c$ are arranged inside of the tank at opposite sides thereof, the wheels being so arranged as to permit the lower runs of the chains to pass near the upper face of the strainer. Scrapers are secured to the chains at intervals and are adapted to pass upwardly over the strainer with the lower runs of the chains and to scrape the surface of the strainer and carry the hops upwardly on the strainer out of the wort. The scrapers consist of blades D of more or less resilient material, spring copper being preferably used. These blades extend transversely of the machine and are provided with a plurality of vertical slots forming fingers $d$ $d$, the lower edges of which pass over the strainer. By providing the lower edges of the blades with a large number of resilient fingers, the fingers passing over an uneven part of the strainer will flex so as to follow into any depressions in the surface of the strainer and to pass over any raised portions thereon, while the operation of the other fingers of the scraper blade will not be interfered with. The scraper blades D are clamped between rigid supporting bars $d'$, Fig. 9, and clamping bars $d^2$, by means of screws or bolts $d^3$ which pass through slots $d^4$ in the scraper blades to permit the blades to be adjusted relatively to the strainer. Thus as the ends of the fingers $d$ $d$ become worn, the scraper blades can be adjusted relatively to the bars $d'$ to compensate for the wear. The supporting bars $d'$ are secured at their ends to the sprocket chains C C and are preferably T-shaped in cross section. The chains are preferably provided at intervals with links having integral extensions $d^5$ to which the ends of the supporting bars $d'$ are secured. Other means for adjustably securing the scraper plates to the chains may be employed if desired.

Figure 1:
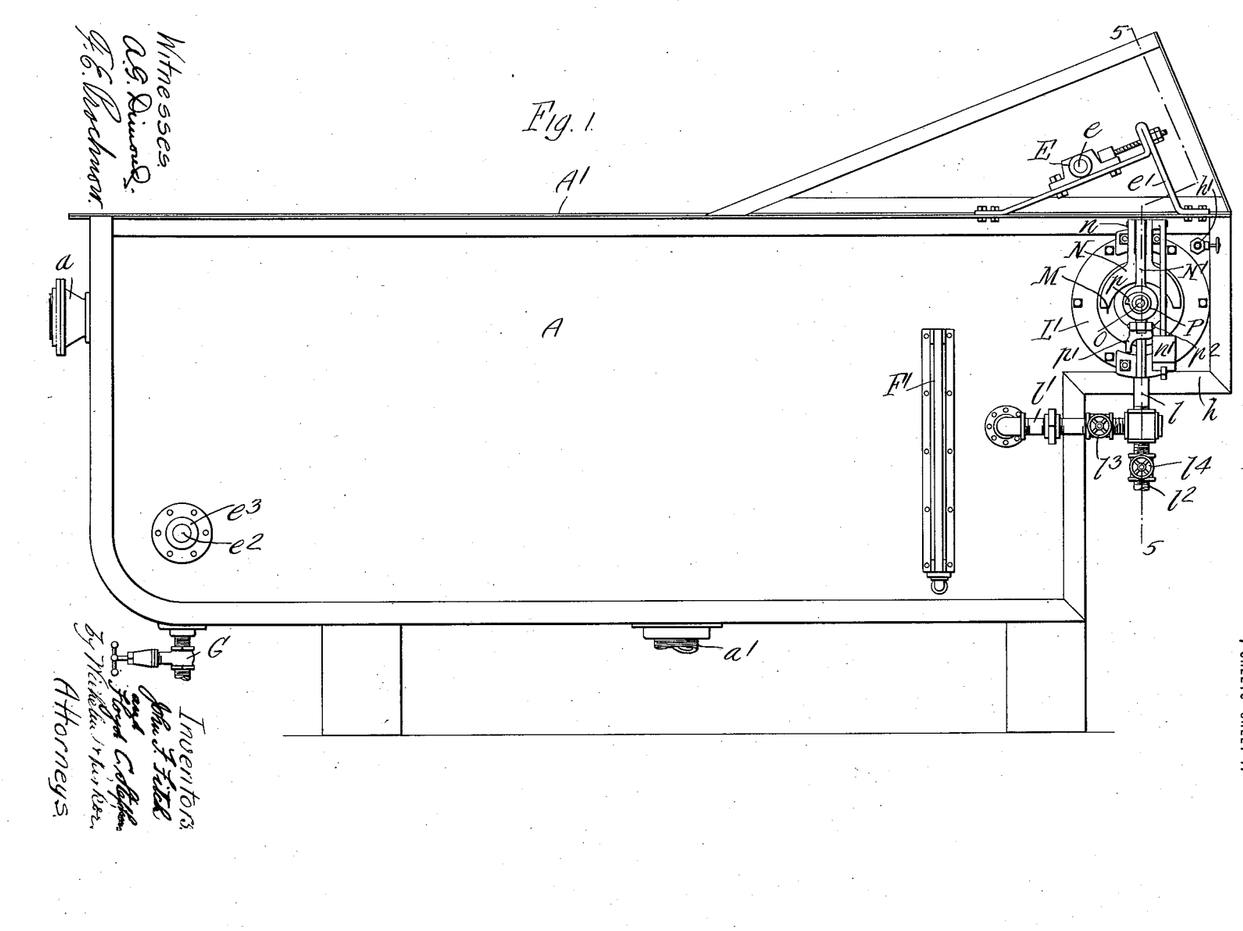
Figure 1 is a side elevation of an apparatus embodying the invention.
Figure 2:
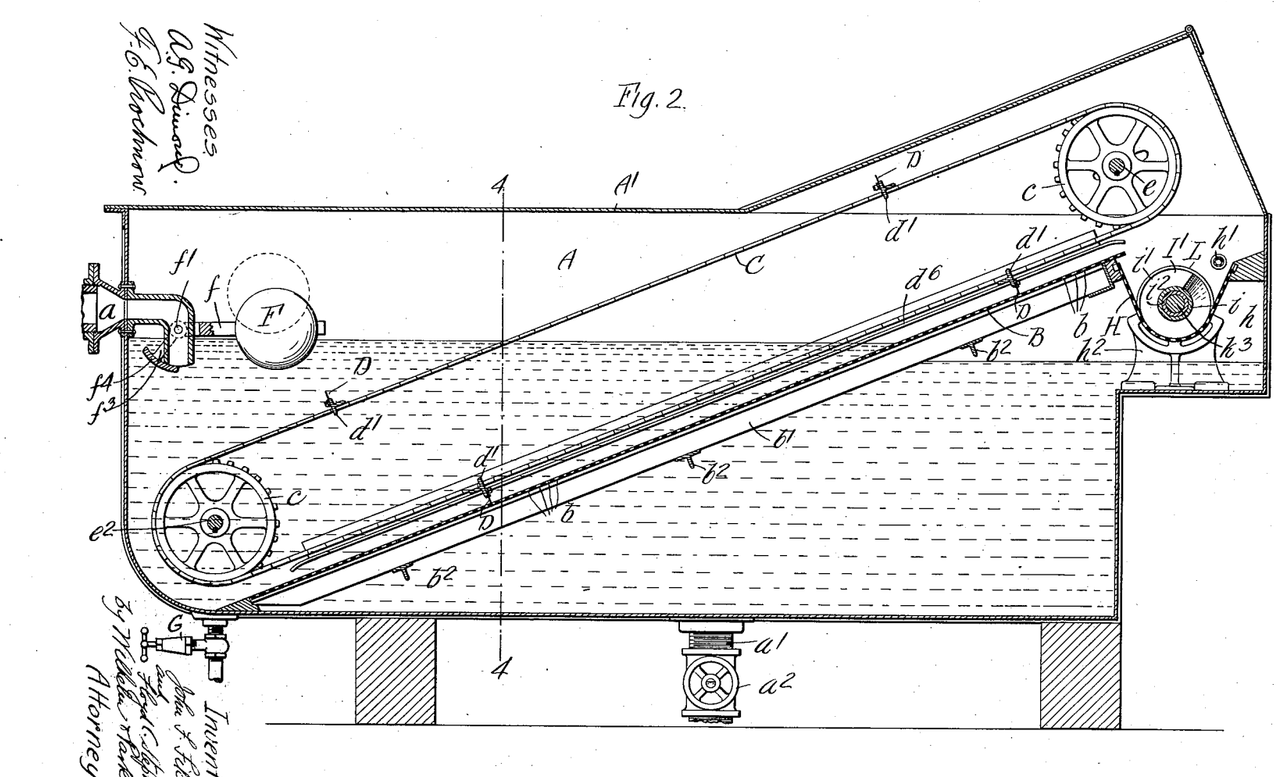
Fig. 2 is a longitudinal sectional elevation thereof.
Figure 3:
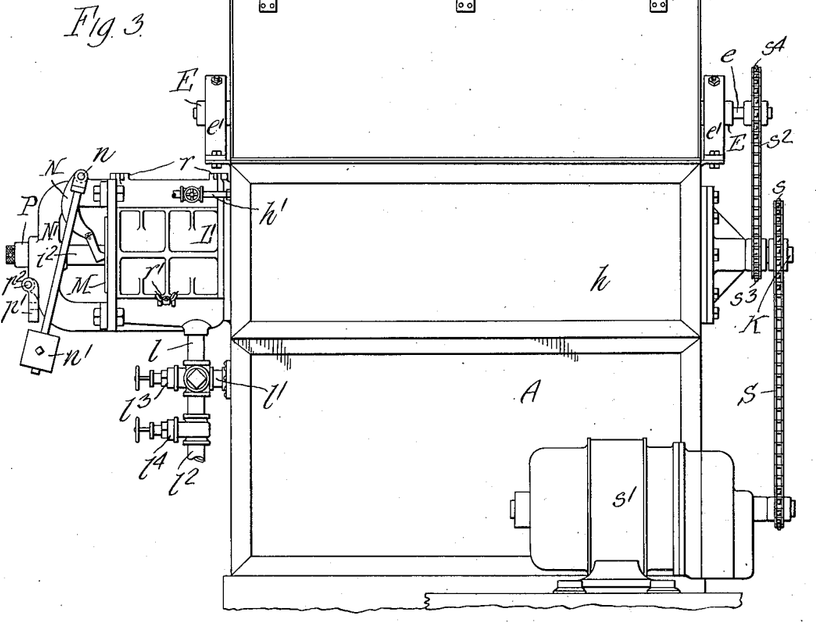
Fig. 3 is an end elevation thereof.
Figure 4:
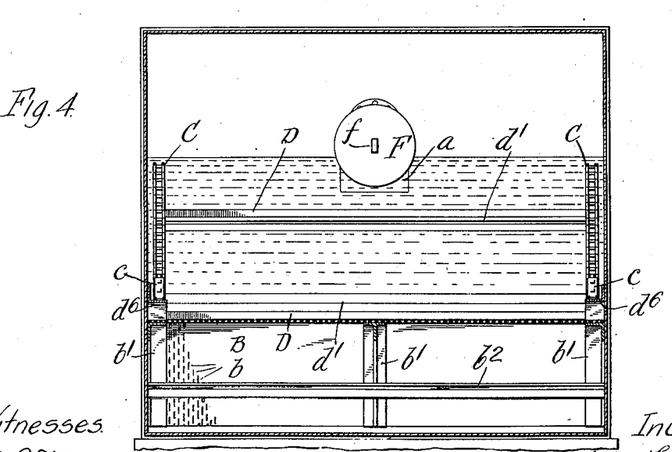
Fig. 4 is a transverse sectional elevation thereof, on line 4—4, Fig. 2.
Figure 5:
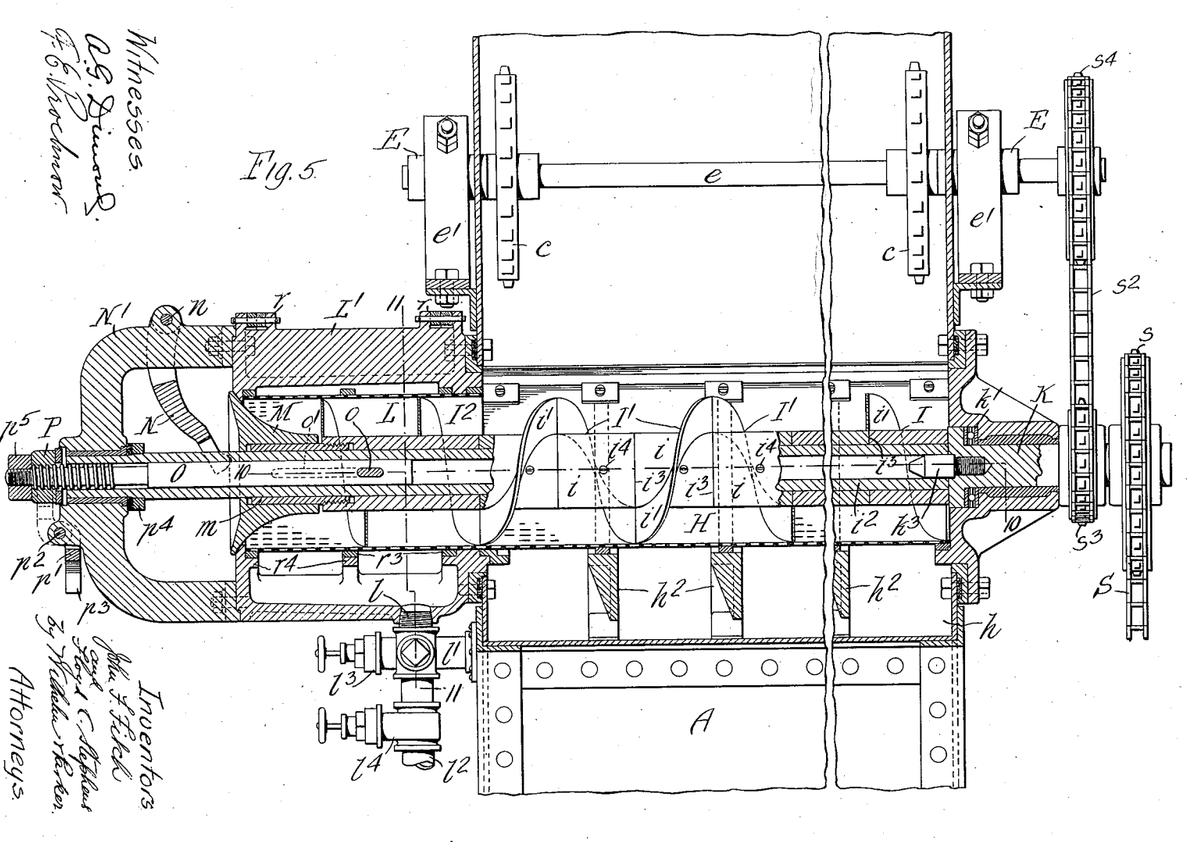
Fig. 5 is a fragmentary transverse sectional elevation of the apparatus, on an enlarged scale on line 5—5, Fig. 1, showing the means for compressing the solid matter and a transverse conveyer for feeding the solid matter to the compressing means.
Figures 7, 8, 9, 10:
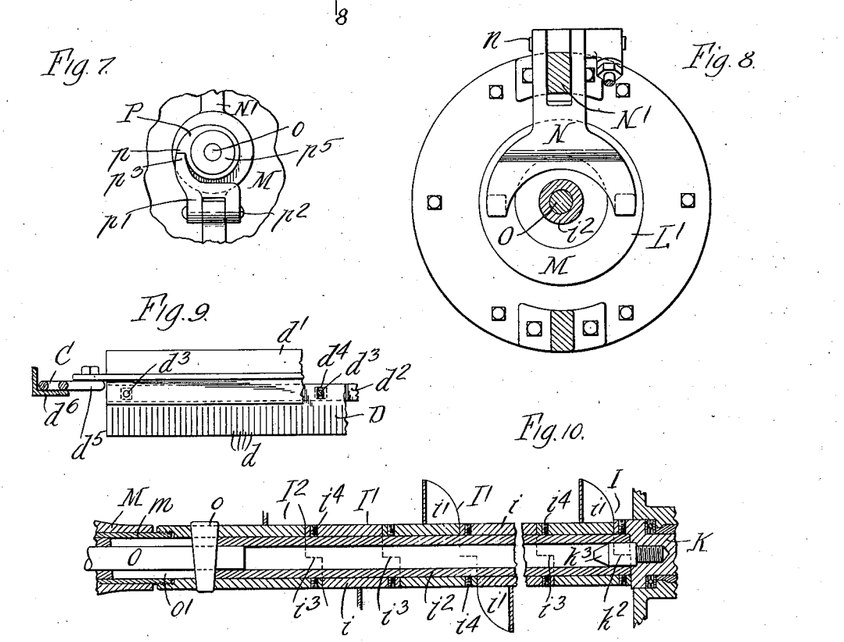
Fig. 7 is a fragmentary side elevation of the compression means.
Fig. 8 is a sectional elevation on line 8—8, Fig. 6.
Fig. 9 is a fragmentary elevation of one of the scrapers which remove the solid matter from the screen.
Fig. 10 is a fragmentary plan view on line 10—10, Fig. 5.
Figure 10A:
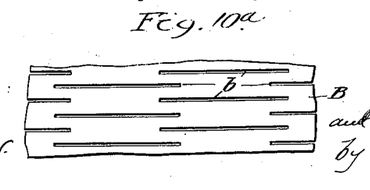

The lower runs of the chains rest on guide rails $d^6$, Figs. 2, 4 and 9, secured to the sides of the tank. The supporting bars $d'$, being rigidly secured to links of the chain, are therefore also supported by the guide rail in such a manner that the scraper fingers $d$ are relieved of the weight of the scrapers.

As shown, the upper pair of sprocket wheels is secured on a shaft $e$ journaled at its opposite ends in bearings E which are adjustably mounted on brackets $e'$ on the tank for regulating the tension of the chains. The lower pair of sprocket wheels is secured on a shaft $e^2$ journaled in bearings $e^3$ in the wall of the tank.

It is desirable to automatically regulate the level of the wort in the tank. This is accomplished in the construction shown by means of a flat valve consisting of a float F mounted on one arm of a lever $f$, Fig. 2, pivoted at $f'$ on the wort inlet pipe $a$, and a valve $f^4$ which is secured to another arm $f^3$ of the lever $f$ and is adapted to open and close the end of the inlet pipe to regulate the flow of wort into the tank. The discharge of wort from the tank is preferably so regulated by means of the valve $a^2$ that the difference in level of the wort at opposite sides of the strainer is slight, so that the suction at each of the slots or openings in the strainer caused by the flow of wort from the upper to the lower side of the strainer will be slight and will not be strong enough to prevent the removing by the scraper of any hop leaves that may clog up the slots or openings. F' represents a gage glass by means of which the level of the strained liquid in the tank can be determined.

G represents a valve which may be opened when the apparatus is being cleaned for draining off the cleaning water.

By means of the construction described, the continuous removal of hops from the wort prevents the dissolving of the undesirable resins in the wort while the wort is being strained, and the time required to strain a quantity of wort is greatly reduced since the holes in the strainer are not allowed to become clogged by the hop leaves, so that the wort flows freely and rapidly through the strainer.

The scrapers in traveling upwardly over the strainer scrape the hops upwardly on the strainer and as the same pass out of the wort, to the upper part of the strainer, a part of the wort drains off through the strainer. The hops are delivered from the upper end of the strainer into a perforated straining trough H which is arranged transversely of the tank, preferably in an offset portion $h$ of the tank. In the construction shown in Figs. 1–6, the hops in the trough H are washed by means of jets of water, which issue from a sparge pipe $h'$ extending lengthwise of the trough. The wort washed out of the hops, together with the sparge water are then strained through the perforations in the trough and mix with the wort in the lower part of the tank. The trough, as shown, is supported in the offset portion of the tank upon suitable standards or supports $h^2$.

The hops in the trough H are moved lengthwise therein by any suitable means, such as a screw conveyer, which feeds the hops into a compression chamber, where they are compressed by the conveyer and automatically discharged from the machine. The conveyer is preferably made in flights or sections I I' I$^2$, mounted to rotate about a common axis to enable the conveyer to be readily removed from the apparatus. Each of these sections comprises a sleeve portion $i$ and a spiral portion $i'$, the outer edges of which are adapted to engage the lower portion of the trough to feed the hops forwardly therein. The conveyer sections are all mounted on a shaft $i^2$, preferably made hollow, which extends through the sleeves of the sections.

The conveyer sections are connected so as to turn together as a single continuous conveyer, by means of interengaging shoulders $i^3$ on the ends of the sleeve portions $i$ of the sections. The intermediate sections I' of the conveyer are provided with shoulders at both ends, but the section I$^2$ is provided with shoulders only at the inner end to receive power from the preceding section. The pitch of the spiral portion of this last section is less than that of the other sections in order to enable this section to exert greater pressure upon the hops in the compression chamber. The first section I of the conveyer receives its power from a stud shaft K mounted on the side of the tank, a thrust bearing $k'$ being provided to resist the end thrust of the conveyer when in operation. The stud shaft is provided with a shouldered end $k^2$ adapted to engage with the shoulders $i^3$ of the sleeve of the first section of the conveyer. The shaft $i^2$ on which the conveyer sections are mounted serves to aline the sections and is not depended upon to transmit power from the stud shaft K to the conveyer sections. The sections are, however, preferably secured to the shaft by set screws $i^4$, which hold the sections in place on the shaft. The shaft $i^2$ is centered relatively to the stud shaft K by a centering stud $k^3$ secured on the stud shaft and entering into the end of the hollow shaft $i^2$. The centering stud has a threaded shank screwed into a threaded hole in the stud shaft K, so that the centering stud can be readily removed if necessary.

The hops are fed by the conveyer from the trough into a compression chamber consisting of a perforated cylinder L mounted in a suitable frame or casing L' secured to the side of the tank. The outer end of the compression cylinder is closed by means of a movable head or end wall M which is yieldingly held against the end of the cylinder and is adapted to be moved outwardly away from the end of the cylinder by the pressure of the hops thereon produced by the screw conveyer. The liquid expressed from the hops in the compression cylinder is collected in the trough-shaped bottom of the casing L' and can be discharged therefrom through a pipe $l$ either to a pipe $l'$ leading into the tank A or to a waste pipe $l^2$. In the construction shown, the flow of liquid in the pipes $l'$ and $l^2$ is controlled by means of valves $l^3$ and $l^4$.

Figure 6:
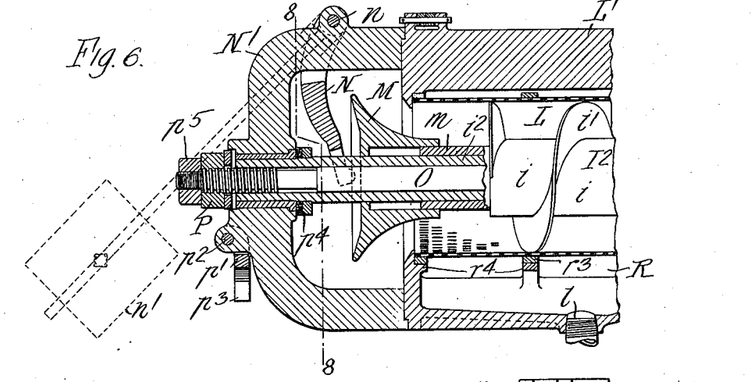
Fig. 6 is a fragmentary sectional elevation showing the parts of the compressing means in different positions.

The movable head M, in the construction shown, is slidably arranged on the conveyer shaft $i^2$ and on a sleeve $m$ secured to the last conveyer section. The head is preferably made with its inner face flaring outwardly so that the hops on being pressed out of the compression cylinder will be forced out radially with regard to the conveyer shaft and discharged from the apparatus when the head is in its outer position, as shown in Fig. 6.

Any suitable means may be employed for yieldingly pressing the cylinder head toward the cylinder, those shown in the drawings comprising a lever N, pivoted at $n$ in a bracket N' secured on the cylinder casing and which also supports a bearing for the end of the conveyer shaft. The lever N has a bifurcated arm engaging the cylinder head M, and an arm on which a weight $n'$ is adjustably secured. The weight tends to swing the lever in a direction to move the cylinder head M toward the cylinder, and by adjusting the position of the weight on the lever the pressure which is exerted by the lever on the cylinder head can be varied as desired.

Means of suitable construction can be provided for facilitating the cleaning of the compression chamber after the operation of straining the wort has been completed. For this purpose, the last conveyer flight or section $I^2$ is arranged to be moved out of the compression cylinder to discharge the compressed hops therefrom. To permit this to be done, a shaft O is slidably arranged within the hollow conveyer shaft $i^2$ and projects beyond the end thereof. This shaft is rigidly connected with the conveyer section $I^2$ by a key $o$, extending through a slot $o'$ in the hollow shaft $i^2$. By this arrangement the shaft O, the conveyer shaft $i^2$ and the conveyer section will all rotate together, but the conveyer section and the shaft O are adapted to be moved outwardly with regard to the conveyer shaft, by drawing the shaft O out of the hollow shaft $i^2$. This may be accomplished by the following means:

The end of the shaft O is screwthreaded and adapted to engage with a corresponding internally threaded nut P. During the operation of the apparatus, the nut turns with the shaft, but if it is desired to draw the conveyer section $I^2$ out of the compression cylinder, the nut can be held from rotation on the conveyer shaft, in which case the screwthreaded portion of the shaft O turning in the nut, will draw the section $I^2$ of the conveyer out of the compression cylinder. For this purpose, in the construction shown, the nut P is provided with a projection or shoulder $p$ which is adapted to be engaged by a locking dog $p'$ pivoted at $p^2$ on the bracket N'. This dog has a finger $p^3$ which swings into the path of movement of the projection $p$ on the nut when the dog is swung on its pivot into the position shown in Fig. 7, and stops the rotation of the nut with the conveyer shaft. The conveyer shaft is held against endwise movement with the inner shaft O by a thrust bearing $p^4$. $p^5$ represents a nut secured at the outer end of the shaft O and which acts as a stop to limit the outward movement of the nut P on the shaft.

The cleaning of the compression cylinder L and the conveyer section located within this cylinder can be further facilitated, if desired, by providing the frame or casing L' inclosing the compression cylinder with side walls, adapted to move out of their operative positions to afford access to the interior thereof, and by constructing the compression cylinder in sections or parts adapted to be removed from the frame of casing L'. For this purpose, the sides R R of the casing L' shown are pivoted by hinges $r$ arranged at the upper portion of the frame. The sides are adapted to be held in their operative positions by means of thumb screws $r'$ engaging on stud bolts $r^2$ pivoted on the casing L' and adapted to enter into slots in the sides R of the casing.

The compression cylinder L shown is divided lengthwise into two parts which are adapted to be held in place by the sides R of the casing. Each of the two parts of the cylinder is provided with semi-circular reinforcing bands $r^3$ which rest on supporting shoulders $r^4$ formed in the casing L' and are adapted to engage with ribs $r^5$ formed on the inner faces of the sides R for holding the cylinder in place. A space is thus formed between the cylinder and the sides of the casing, in which the liquid expressed from the hops flows to the bottom of the casing. One half of the compression cylinder can be removed through each side of the casing.

The conveyer in the trough H and the scraper for the inclined strainer may be driven in any suitable manner. In the construction shown, power is transmitted to the conveyer by a sprocket chain S engaging with a sprocket wheel $s$ on the stud shaft K of the conveyer. Movement is imparted to the chain by any suitable means, for example, an electric motor $s'$. A second sprocket chain $s^2$ connecting a sprocket wheel $s^3$ on the stud shaft K with a sprocket wheel $s^4$ on the shaft $e$ drives the sprocket wheels $c$ $c$ and the chains C C which carry the scrapers D. Any other suitable means may be employed for driving the movable parts of the apparatus.

Figures 11, 12:
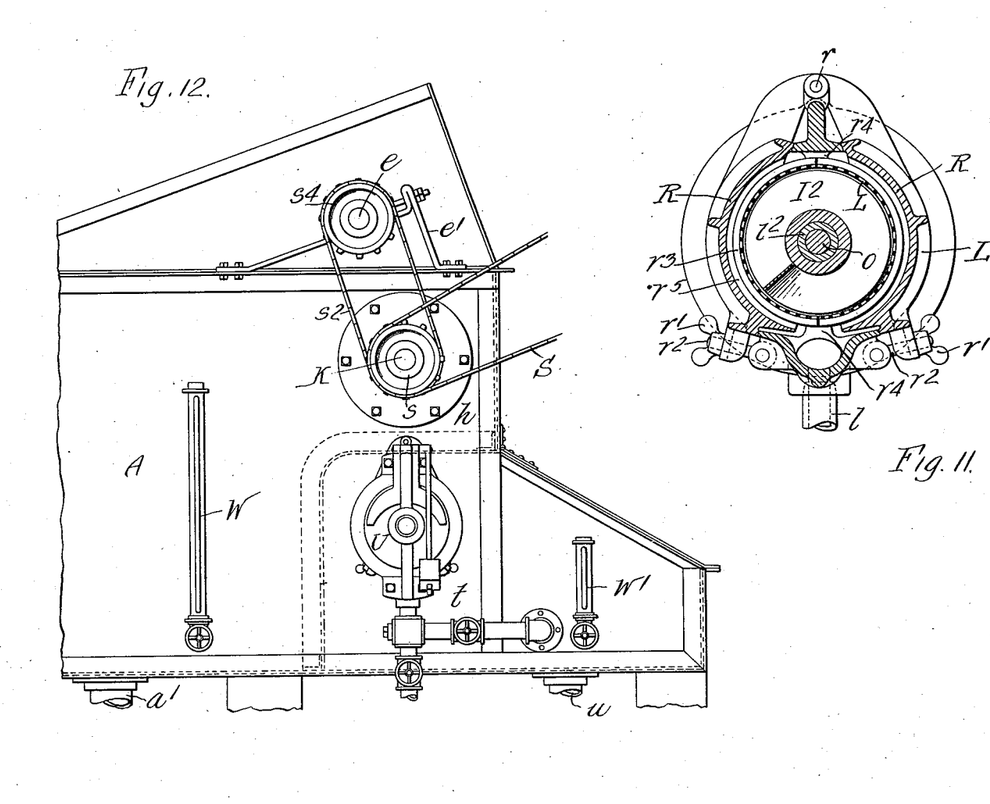
Fig. 11 is a sectional elevation on line 11—11, Fig. 5.
Fig. 12 is an elevation of the rear end of an apparatus of modified construction.
Figure 13:
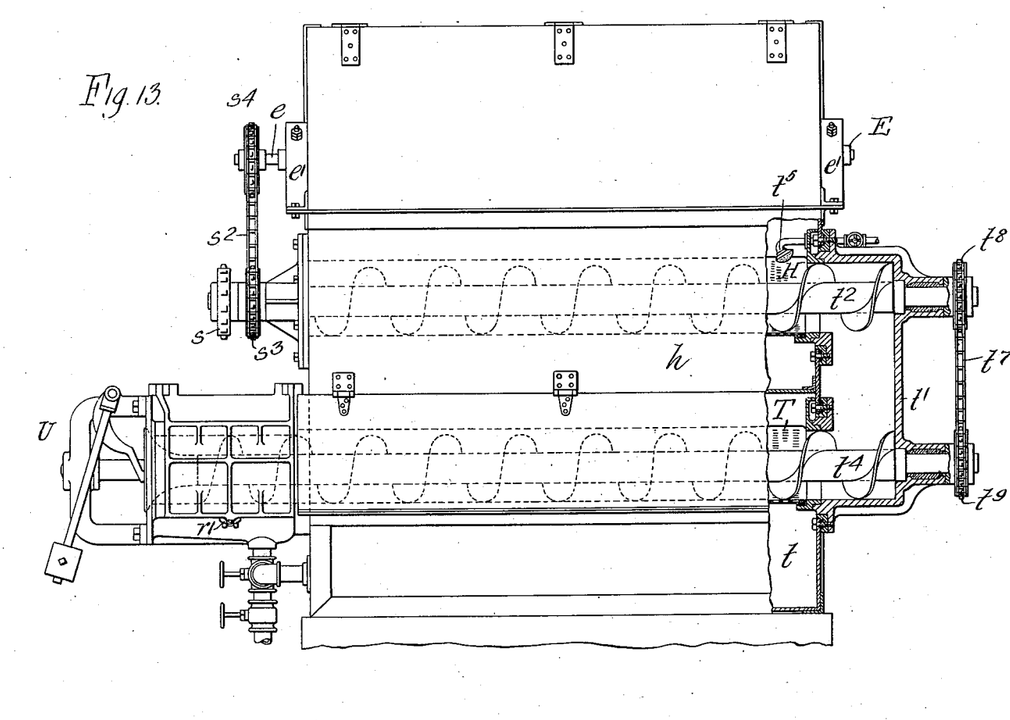
Fig. 13 is a rear elevation thereof, partly in section.

In some cases it is desired to drain and sparge the hops more thoroughly after they leave the strainer B, than can be accomplished by means of the apparatus described. This could be accomplished by merely increasing the length of the trough H and causing the same to extend any desired distance beyond the side of the apparatus. In order, however, to economize in the floor space occupied by the apparatus, the construction shown in Figs. 12 and 13 is preferably employed. In this construction a second trough T is provided below the trough H in a tank or receptacle $t$ arranged under the offset $h$ of the tank A. The trough T is connected with the trough H by means of an upright passage, formed in a casing $t'$ which is secured to the side of the apparatus. A conveyer $t^2$ in the upper trough moves the material in the trough to the casing $t'$ and causes the same to drop to the bottom of the casing, from where it is passed through the lower trough T by means of a conveyer $t^4$. At the end of the lower trough is arranged a compression device U, similar to the one hereinbefore described. A spray nozzle $t^5$, preferably arranged at the end of the upper trough, directs a stream of water at the hops to accomplish the desired sparging. The hops and water pass downwardly through the casing $t'$ and the hops are allowed to thoroughly drain in the lower trough T. The conveyers may be of any suitable construction and the lower conveyer $t^4$ may be driven in any suitable manner, for example, by means of a sprocket chain $t^7$ engaging with sprocket wheels $t^8$ and $t^9$ on the shaft of the upper and lower conveyers.

The sparge water is preferably allowed to collect in the tank $t$ until the entire wort has been strained and is then drawn off through a pipe $u$.

W and W' represent gage glasses in the tanks A and $t$ whereby the level of the liquid in the tanks can be determined.

We claim as our invention:

1. The combination of a strainer for liquids, and a scraper adapted to pass over the surface of the strainer and consisting of a strip of resilient material provided with a plurality of transverse slots dividing the lower edge of the strip into a plurality of resilient fingers which yield to conform with irregularities in the surface of the strainer.

2. The combination of a strainer for liquids, a scraper adapted to pass over the surface of the strainer and consisting of a strip of resilient material provided with a plurality of transverse slots dividing the lower edge of the strip into a plurality of resilient fingers which yield to conform with irregularities in the surface of the strainer, and means for adjusting said strip relatively to the surface of the strainer.

3. The combination of a strainer for liquids, a scraper adapted to pass over the surface of said strainer and consisting of a strip of resilient material provided with a plurality of resilient fingers, a supporting member for said strip movable in proximity to said strainer, means for adjustably securing said strip to said supporting member to permit the adjustment of said fingers relatively to said strainer, and means for imparting movement to said supporting member for causing said scraper to travel over the surface of the strainer.

4. The combination of a strainer, endless traveling chains arranged at opposite sides of said strainer, cross bars extending across said strainer and connected at opposite ends to said chains, and a strip mounted on said bars and adjustable thereon toward and from said strainer, said strip having resilient fingers adapted to be passed over the surface of said strainer in contact therewith by said chains.

5. The combination of a strainer, endless traveling chains arranged at opposite sides of said strainer, cross bars extending across said strainer and connected at opposite ends to said chains, resilient fingers secured on said bars and adjustable thereon toward and from said strainer and adapted to be passed by said chains over the surface of said strainer in contact therewith, and supporting rails on which said chains are supported whereby the strainer is relieved of the weight of the chains and fingers.

6. In an apparatus for straining liquid containing non-liquid materials, the combination of a tank, liquid supply and discharge means arranged to maintain a body of liquid in the tank, a strainer in said tank at least partly submerged in the liquid and through which the liquid flows, a straining trough arranged in operative relation to the strainer at one end of the strainer and in which the material is adapted to be drained, and means acting substantially continuously during the straining operation for moving the material from the strainer into the trough and for moving the material lengthwise of the trough during the straining operation, said straining trough being arranged relative to said tank to cause the liquid drained from the material in said trough to be returned to the liquid strained in said tank.

7. In an apparatus for straining liquid containing non-liquid materials, the combination of a tank, liquid supply and discharge means arranged to maintain a body of liquid in the tank, an inclined strainer in said tank through which the liquid flows and the upper end of which extends out of the liquid, a straining trough arranged at the upper end of the strainer in operative relation thereto and to which the material is delivered from the strainer, movable means for moving the material upwardly on said strainer substantially continuously during the straining operation and delivering the same into the trough, means for moving the material lengthwise in said straining trough and out of said apparatus during the straining operation, and means for returning the liquid drained from the material in said trough to the liquid strained in the tank.

8. In an apparatus for straining liquid containing non-liquid materials, the combination of a tank, liquid supply and discharge means arranged to maintain a body of liquid in the tank, a strainer in said tank through which the liquid flows, means movable over the surface of said strainer to remove the material therefrom substantially continuously during the straining operation, a straining trough located out of the liquid and into which the material is delivered from the strainer, means for washing the material in said trough to remove therefrom the liquid remaining in the material, means for moving the material through said trough during the straining operation and for removing the same from the apparatus, and means for returning the liquid drained from the material in said trough to the liquid strained in the tank.

9. In an apparatus for straining liquid containing non-liquid materials, the combination of a tank, liquid supply and discharge means arranged to maintain a body of liquid in the tank, a strainer in said trough through which the liquid flows and the upper portion of which extends above the level of the liquid, a straining trough arranged out of the liquid and in operative relation to the upper end of said strainer and to which the material is delivered from said strainer, means movable over the surface of said strainer to remove the material therefrom substantially continuously during the straining operation and deliver the same into said trough, means for moving the material through said trough during the straining operation, means for washing the material in said trough to remove therefrom the liquid remaining in the material, said liquid being returned to said tank, and means for discharging the material from the apparatus and compressing the material as it is being discharged to further remove liquid therefrom.

10. In an apparatus for straining liquid containing non-liquid material, the combination of a strainer consisting of a plate provided with a plurality of relatively long and narrow perforations, and scrapers passing over said strainer lengthwise of said perforations for removing from the strainer the material collected thereon.

11. In an apparatus for straining liquid containing non-liquid material, the combination of a strainer consisting of a plate having a substantially flat face and provided with a plurality of relatively long and narrow perforations, and a scraper comprising a plurality of resilient fingers which pass over said flat face of the strainer substantially lengthwise of said perforations for removing from the strainer the material collected thereon.

12. In an apparatus for straining liquid containing non-liquid material, the combination of a strainer consisting of a plate having a substantially flat face and provided with perforations, a scraper comprising a plurality of flat resilient fingers which pass over said flat face of the plate for removing from the strainer the material collected thereon, and means for moving said fingers over the said face of the strainer, said fingers being moved with their flat faces facing the direction of motion.

Witness our hands, this 31st day of March, 1914.

JOHN F. FITCH.
FLOYD C. STEPHENS.

Witnesses:
RUDOLF BUECKING,
LAURA M. UEBELE.